UNITED STATES PATENT OFFICE.

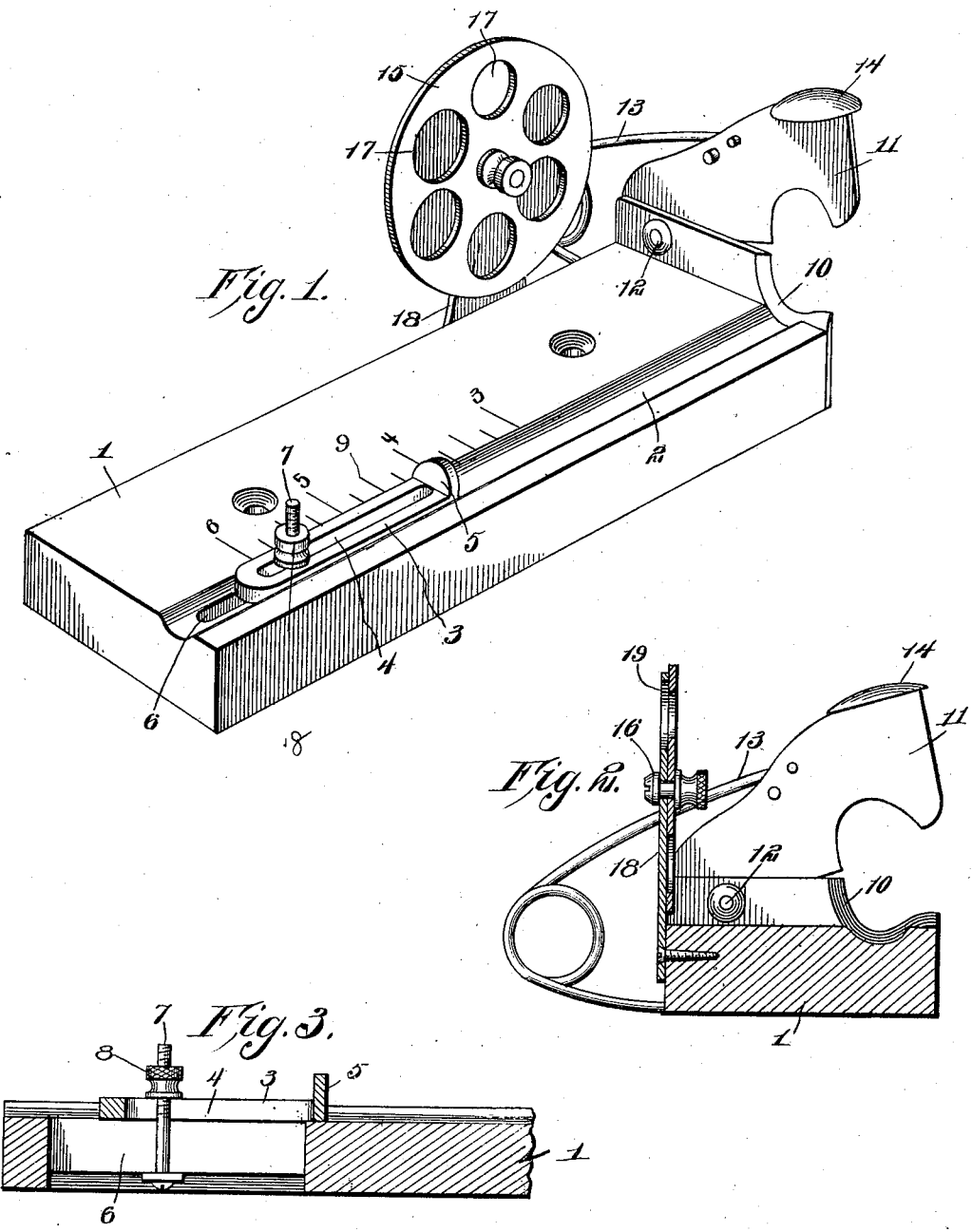

THEODORE ECKARD, OF BALTIMORE, MARYLAND.

CIGAR-GAGE.

No. 861,443.          Specification of Letters Patent.          Patented July 30, 1907.

Application filed August 25, 1906. Serial No. 332,063.

*To all whom it may concern:*

Be it known that I, THEODORE ECKARD, a citizen of the United States, residing at the city of Baltimore and State of Maryland, have invented new and useful Improvements in Cigar-Gages, of which the following is a specification.

This invention relates to cigar gages, and the principal object of the same is to provide a device of simple structure which will gage the length of a cigar and also the size or diameter of the same.

Another object of the invention is to provide a simple and convenient tool for cigar makers' use for quickly gaging the length of a cigar and cutting the same at the required length and to quickly gage the diameter or size of the cigar through any portion of its length.

The objects referred to are attained by means of the construction illustrated in the accompanying drawing, in which:—

Figure 1 is a perspective view of a cigar gage made in accordance with my invention. Fig. 2 is a front to rear vertical section of the same. Fig. 3 is a detail longitudinal section taken through the sliding gage and the body portion of the tool.

Referring to the drawing for a more particular description of my invention, the numeral 1 designates the base or body portion of the gage which is provided with a longitudinal groove 2 of a size to contain a cigar. Mounted to slide at one end of said groove is a gage member 3, said gage member being slotted at 4 and provided with a gage lug 5 at one end. A slot 6 is formed in the bottom of the groove 2, and the gage member 3 is mounted to slide in the groove 2 and to be held in any required adjustment by means of the bolt or screw 7 fitted with a thumb nut 8 for holding the gage in position. Indicating marks 9 are arranged upon the base 1 contiguous to the groove 2 to indicate the length of the cigar. A cutter comprising a stationary member 10 is secured at one end of the base 1, and a movable cutter 11 pivoted at 12 to the member 10 is provided with a spring 13 for holding the members 10 and 11 separated. A knob 14 is formed on the pivot member 11 for operating the cutter. A diameter gage 15 is pivoted upon a screw 16 and provided with a number of circular apertures 17 of different sizes. The diameter gage 15 is in the form of a disk, and the pivot screw 16 passes centrally through said disk and through a supporting plate 18 secured to the rear side of the base 1, said supporting plate having an aperture 19 at its upper end.

The operation of my invention may be briefly described as follows: When it is desired to cut cigars of a given length the gage member 3 is adjusted to the required length, and the diameter gage 15 is moved upon its pivot 16 to bring the required aperture 17 into coincidence with the aperture 19 in the supporting plate 18. The cigars are then cut by means of the cutter 10, 11, and the diameter of the cigar is determined by inserting it into the aperture 17 in the diameter gage. In this way cigars of a given diameter and length may be quickly gaged.

From the foregoing it will be obvious that an instrument made in accordance with my invention may be used to advantage by cigar makers in quickly determining the size of the cigar, and the same may be cut into the required length, the adjustments being quickly made for cigars of different sizes.

Having thus described the invention, what is claimed as new, is:—

The herein described cigar gage consisting of a supporting plate provided with a single aperture therein, and a gage plate comprising a disk pivoted centrally upon said supporting plate and provided with a series of graduated apertures, said gage plate being rotatable to bring any of its apertures into coincidence with the single aperture in the supporting plate, and means for securing the gage plate to the supporting plate, substantially as described.

In testimony whereof, I affix my signature in presence of two witnesses.

THEODORE ECKARD.

Witnesses:
WM. B. LEDDON,
GEO. D. NORRIS.